(12) United States Patent
Hardy (10) Patent No.: US 9,483,560 B2
(45) Date of Patent: Nov. 1, 2016

(54) DATA ANALYSIS CONTROL (71) Applicant: LONGSAND LIMITED, Cambridge (GB)

(72) Inventor: Dermot Hardy, Belfast (IE)

(73) Assignee: Longsand Limited, Cambridge (GB)

( * ) Notice: Subject to any disclaimer, the term of this patent is extended or adjusted under 35 U.S.C. 154(b) by 279 days.

(21) Appl. No.: 13/955,942

(22) Filed: Jul. 31, 2013

(65) Prior Publication Data
US 2015/0039598 A1 Feb. 5, 2015

(51) Int. Cl.
*G06F 17/30* (2006.01)

(52) U.S. Cl.
CPC .............................. *G06F 17/30864* (2013.01)

(58) Field of Classification Search
CPC ........ G06F 17/18; G06F 17/20; G06F 17/27; G06F 17/30781; G06F 17/2715; G06F 17/2818; G06F 17/30536; G06F 17/3053; G06F 17/30864
USPC ....................................................... 707/723
See application file for complete search history.

(56) References Cited

U.S. PATENT DOCUMENTS

| 7,761,922 | B1* | 7/2010 | Baum | G06F 21/10 726/26 |
| --- | --- | --- | --- | --- |
| 8,250,325 | B2 | 8/2012 | Holdman et al. | |
| 8,346,824 | B1 | 1/2013 | Lyle et al. | |
| 2002/0055920 | A1* | 5/2002 | Fanning | G06F 17/30722 |
| 2006/0047649 | A1* | 3/2006 | Liang | G06F 17/30864 |
| 2006/0106793 | A1* | 5/2006 | Liang | G06F 17/30654 |
| 2008/0270363 | A1* | 10/2008 | Hunt | G06F 17/30489 |
| 2009/0094520 | A1* | 4/2009 | Kulas | G06F 17/30056 715/723 |
| 2010/0026842 | A1* | 2/2010 | Ishizaka | G06F 17/30781 348/231.2 |
| 2010/0057916 | A1* | 3/2010 | Sieffert | G06F 17/3089 709/226 |
| 2011/0055420 | A1* | 3/2011 | Zuckerman | H04L 67/1008 709/231 |
| 2011/0060742 | A1* | 3/2011 | Heller | G06F 17/3002 707/741 |
| 2012/0150819 | A1* | 6/2012 | Lindahl | G06F 17/30578 707/687 |
| 2012/0224741 | A1 | 9/2012 | Edwards et al. | |
| 2012/0296891 | A1 | 11/2012 | Rangan | |
| 2013/0124193 | A1* | 5/2013 | Holmberg | G06F 17/27 704/9 |
| 2014/0051380 | A1* | 2/2014 | Kleve | G10L 15/22 455/404.1 |

OTHER PUBLICATIONS

Lihue, et al.; "Proceedings of HotOS IX: The 9th Workshop on Hot Topics in Operating Systems"; May 18-21, 2013; 7 pages.

* cited by examiner

Primary Examiner — Hosain Alam
Assistant Examiner — Saba Ahmed
(74) Attorney, Agent, or Firm — Mannava & Kang, P.C.

(57) ABSTRACT

According to an example, data analysis control may include receiving a predetermined number of search results for a query, and organizing the predetermined number of search results by checksum values of content of the search results in an ascending or a descending order. A generally final or a generally initial checksum value may be respectively used from the ascending or the descending order of the organized search results to determine a total content number representing an approximate total content of a search related to the query, where the total content number is greater than the predetermined number of search results. Further, the determined total content number may be used to determine a number of sub-tasks needed to complete a full search of the approximate total content.

15 Claims, 5 Drawing Sheets

DATA ANALYSIS CONTROL

BACKGROUND

A document search engine typically includes content indexes that facilitate efficient and accurate information retrieval. For example, an enterprise search system typically ingests content and processes the content to generate content indexes that are optimized for quick lookups to thereby facilitate users querying the enterprise search system. To cope with large volumes of data, multiple search engines containing multiple content indexes are often needed. This often leads to the use of a federated search engine to distribute queries between search engines and to aggregate results. With respect to data analysis control, the choice of a search engine to process a search is typically based on the date that the content is ingested into the enterprise search system. For example, in order to extend the enterprise search system to cope with ever-increasing volume of data, distribution of the content being ingested is typically based on the date that the content is ingested. This allows for the addition of new empty search engines, without the need to re-distribute already indexed content.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

A checksum or hash sum is a datum computed from an arbitrary block of digital data for the purpose of detecting errors that may have been introduced during transmission or storage of the block of digital data. The checksum may be used to evaluate the integrity of the data block at any later time by re-computing the checksum and comparing it with the stored checksum. If the re-computed and stored checksums match, the digital data block may be considered to be unaltered. A content index may include a checksum that is generated and stored in the content index, for example, for change detection and duplicate detection. For example, a MD5 cryptographic hash function may generate a checksum in the form of a 128-bit (16-byte) hash value. Similarly, other functions, such as, for example, a secure hash algorithm (SHA) hash function may generate a checksum in the form of a 160-bit hash value.

According to an example, a method for a data analysis control, a data analysis control apparatus, and a non-transitory computer readable medium having stored thereon machine readable instructions to provide data analysis control are disclosed herein. The data analysis control disclosed herein may include using the generally (i.e., approximately) uniform distribution of a checksum field to assign agents (i.e., search engines) to process a search. For example, the data analysis control disclosed herein may use a checksum field to determine an optimum number of sub-tasks needed to complete a task (e.g., a search task), and thus an optimum number of partial trawls needed to complete a task. For each of the sub-tasks, a generally equal share of the search load may be carried by an agent by dividing a dataset range into ranges for partial trawls. The data analysis control disclosed herein may include performing one pass over the total dataset for each of the sub-tasks. The data analysis control disclosed herein may further include marking any items of interest to commence before all sub-tasks complete their pass over the data.

For the data analysis control disclosed herein, using the checksum value to trawl the data in a system may facilitate duplicate detection. Further, collecting all needed fields from various statistics identification modules (i.e., metric classes) may provide a full set of statistics from a single pass of the data. For example, as described herein, each partial trawl may be used to collect all needed statistics to provide a full set of statistics from a single pass of the data.

The data analysis control disclosed herein may include receiving, for example, via a data analysis presentation layer, a query (e.g., a search query for a set of data). The query may be entered, for example, via a user interface. The query may be targeted at an enterprise search system, for example, for determining statistics related to documents. The data analysis control may ensure that initial results to the query are sorted by checksum values in ascending order (or descending order). Based, for example, on the final (or one of the final) checksum values on the results page for the results sorted in ascending order, the data analysis control may include using the chosen checksum value to determine how a search task related to the query should be divided into sub-tasks. The division of the search task related to the query may provide scalability with respect to different agents that are used to perform the sub-tasks. Each agent may query an enterprise search system with different ranges corresponding to the sub-tasks. The agents may query the enterprise search system with generally the same query as the initial query, except that the queries are now in a range allocated to each particular agent. The results of the queries per agent may be returned, for example, to the data analysis control apparatus, and combined and finalized. For example, the results of the queries may be processed through different tiers that include trawl, combine, and finalize phases. The processing of the query results through different tiers may provide efficiency, for example, by combining results from different statistics identification modules (e.g., metric classes related to duplicates, author, date, user requests, documents of interest, etc.) in parallel. Thus, since different statistics related to the query may be written to different files, the statistics may be combined in parallel (e.g., author, department, duplicates, etc., may be combined in parallel). Moreover, different statistics may also be marked in parallel.

According to an example, the data analysis control disclosed herein may include receiving a predetermined number of search results for a query, and organizing the predetermined number of search results by checksum values of content of the search results in an ascending or a descending order. A generally final or a generally initial checksum value may be respectively used from the ascending or the descending order of the organized search results to determine a total content number representing an approximate total content of a search related to the query, where the total content number is greater than the predetermined number of search results. The generally final and generally initial checksum values may represent checksum values that are within a predetermined range of the actual final and the initial checksum values, respectively. For example, for 100 search results that include 100 checksum values, the generally final and generally initial checksum values may represent checksum values that are within a predetermined range of three (or another user-defined range) checksum values of the final (i.e., last) and the initial (i.e., first) checksum values, respectively. Further, the determined total content number may be used to determine a number of sub-tasks needed to complete a full search of the approximate total content. Using the determined total content number to determine a number of sub-tasks needed to complete a full search of the approximate total content may further include determining the number of sub-tasks based on a generally equal distribution of search loads to perform the full search. The data analysis control may further include determining a range for each of the sub-tasks based on the determined total content number representing the approximate total content of the search. The data analysis control may further include processing, for example, by an agent, the approximate total content based on the determined range for each of the sub-tasks, where the processing is designated a trawl phase and includes partial trawls that correspond to the determined range for each of the sub-tasks, and marking predetermined statistics (e.g., duplicates, author, date, user requests, documents of interest, etc.) for the content during at least one of the partial trawls. The data analysis control may further include combining the marked predetermined statistics in parallel for different partial trawls. The data analysis control may further include processing the approximate total content based on the determined range for each of the sub-tasks, where the processing is designated a trawl phase and includes partial trawls that correspond to the determined range for each of the sub-tasks, combining the partial trawls in a combine phase to generate combined files, and combining the combined files to generate final files representing final search results for the query.

Figure 1:
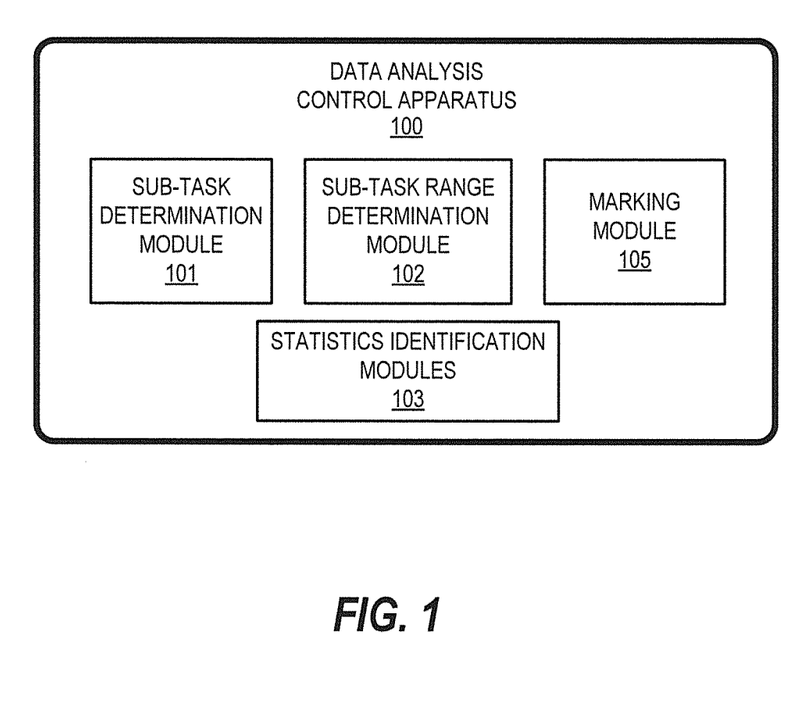
FIG. 1 illustrates an architecture of a data analysis control apparatus, according to an example of the present disclosure.

FIG. 1 illustrates an architecture of a data analysis control apparatus 100, according to an example. Referring to FIG. 1, the apparatus 100 is depicted as including a sub-task determination module 101 to use the generally equal distribution of a checksum field to determine an optimum number of sub-tasks needed to complete a task. A sub-task range determination module 102 may determine a range for each sub-task such that for each of the sub-tasks, a generally equal share of the load may be carried by a search engine. Thus, based on the range determination, a single pass over the total data set may be performed for each of the sub-tasks. Statistics identification modules (i.e., metric classes) 103 may be used to extend the number and types of statistics being gathered (e.g., one statistic identification module per statistic being gathered). For example, the statistics identification modules 103 may identify statistics, such as, author, date, duplicates, documents of interest, etc., or any other user-defined parameter, that may be used for responding to a query 104 (see FIG. 2). A marking module 105 may provide for the marking of statistics of interest (e.g., author, date, duplicates, user requests, documents of interest, etc.) that are identified by the statistics identification modules 103 to commence before all sub-tasks complete their pass over the data.

The modules and other components of the apparatus 100 that perform various other functions in the apparatus 100, may comprise machine readable instructions stored on a non-transitory computer readable medium. In addition, or alternatively, the modules and other components of the apparatus 100 may comprise hardware or a combination of machine readable instructions and hardware.

Figure 2:
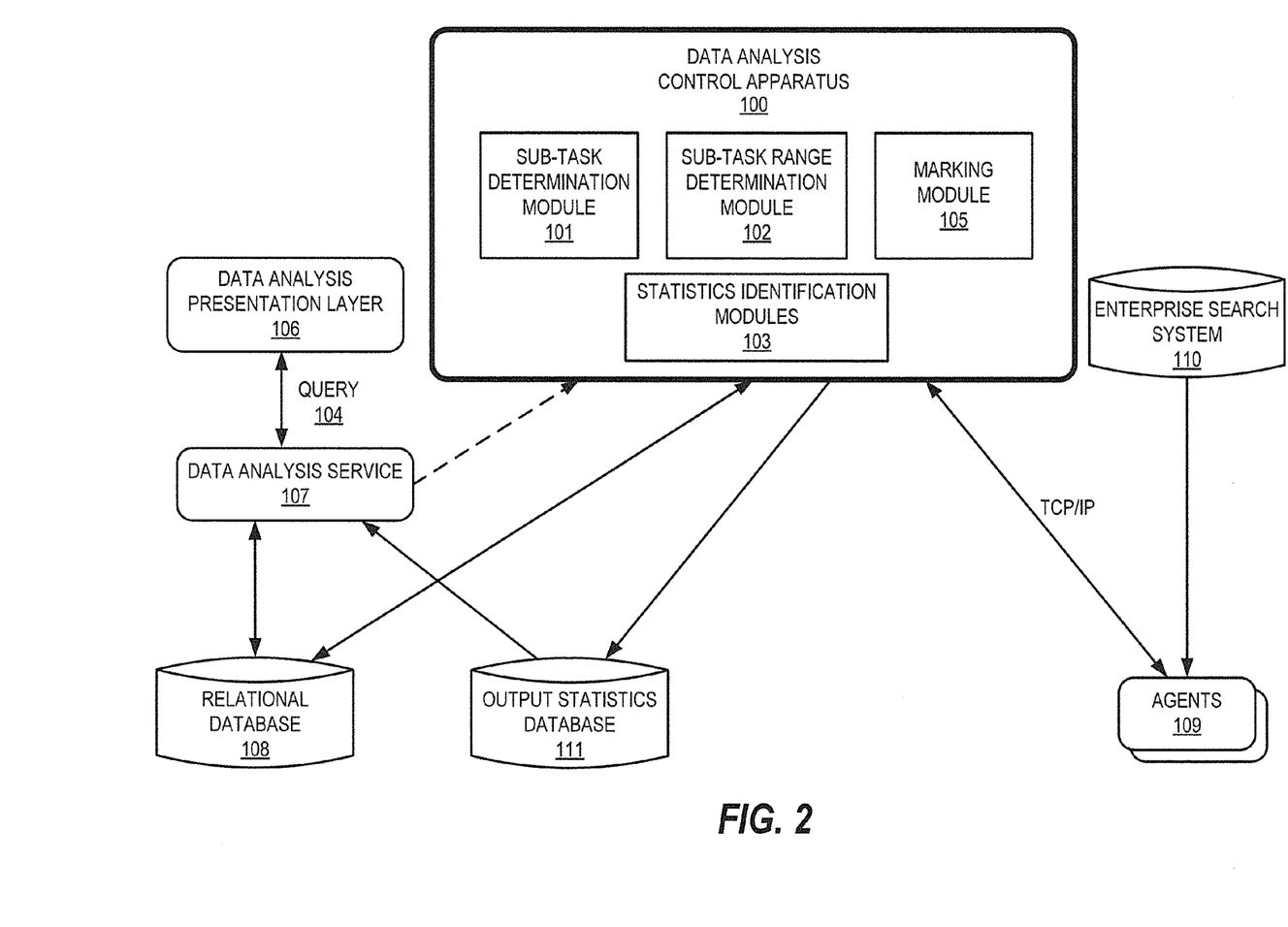
FIG. 2 illustrates an environment for the data analysis control apparatus, according to an example of the present disclosure.

Referring to FIG. 2, an environment for the data analysis control apparatus 100 may include a data analysis presentation layer 106 that may be used to enter information, such as, for example, a query. For example, the data analysis presentation layer 106 may include a graphical user interface (not shown) to enter the query 104. The query 104 may be used by the data analysis service 107 to request, for example, analysis of a specified subset of documents, particular statistics that are to be gathered for the documents, and retrieval of resultant statistics when the analysis has been completed. Upon receipt of the query 104, the data analysis service 107 may inform (e.g., see dashed line of FIG. 2) the data analysis control apparatus 100 of the query 104. If the data analysis control apparatus 100 is active (e.g., not powered off or otherwise inactive), information related to the query 104 may be received by the data analysis control apparatus 100 from a relational database 108.

The data analysis control apparatus 100 may examine the analysis job to be performed for the query 104 and determine how the statistics responsive to the query 104 should be gathered. If there is no single query or a relatively small set of queries that can be used to gather the statistics, the data analysis control apparatus 100 may divide the analysis job into a plurality of partial trawl tasks (see FIG. 3) which will be assigned between available agents 109. The agents 109 may be selected, based, for example, on availability, capacity, etc., of the agents 109.

The agents 109 may be distributed across multiple machines for scalability and redundancy. The agents 109 may use an enterprise search system 110 to process an initial query related to the query 104, and return a predetermined number of documents related to the query 104 (e.g., as a page of results). The agents 109 may also allocated to include multiple agents on each machine. In the event of loss of a temporary network connection to an agent, the agent may attempt to continue to progress the tasks it has been assigned by the data analysis control apparatus 100. However if the network connection outage is not temporary, and the agent does not re-connect to the data analysis control apparatus 100 within a configurable period of time, then the tasks that were assigned to the agent may be re-assigned to another agent.

As tasks are progressed, the data analysis control apparatus 100 may periodically write snapshots of its internal state into the relational database 108. In the event of an outage of a machine that is hosting the data analysis control apparatus 100, any lost information may be recovered from the last snapshot. The relational database 108 may also be used to record jobs (e.g., query processing jobs for the query 104) received by the data analysis service 107. Further, the final results of the query 104 and results related to any query and/or information related to the query 104 may be written to an output statistics database 111.

The enterprise search system 110 may be used by the data analysis control apparatus 100 to respond to the query 104. For example, the data analysis control apparatus 100 may request, via the agents 109, all documents from the enterprise search system 110 for responding to the query 104. Further, the data analysis control apparatus 100 may request retrieval of all documents that include a checksum.

If the data analysis control apparatus 100 determines that the statistic (i.e., information for the query 104) being requested cannot be directly determined through queries to the enterprise search system 110 (i.e., that a trawl of the data will be needed), then the data analysis control apparatus 100 may assign an agent of the agents 109 to make an initial query of the dataset. When the assigned agent queries for the documents that have been specified to be analyzed, the sub-task determination module 101 may request the documents to be sorted (e.g., in ascending or descending order) by the value of the checksum field. For example, documents in various search systems, such as the enterprise search system 110, may include a checksum. Those documents that do not have a checksum may be disregarded. The checksum field may be determined, for example, by using a MD5 cryptographic hash function that generates a checksum in the form of a 128-bit (i.e., 16-byte) hash value. Alternatively or additionally, other types of hash functions that have a generally uniform distribution of the checksum field may be used by the data analysis control apparatus 100. Based on the generally uniform distribution of the checksum field, the sub-task determination module 101 may estimate the size of the dataset from the value of the last (alphabetical) checksum for documents sorted in an ascending order, and the first (alphabetical) checksum for documents sorted in a descending order. Alternatively, the sub-task determination module 101 may estimate the size of the dataset from the value of one of the last (alphabetical) checksums for documents sorted in an ascending order, and one of the first (alphabetical) checksums for documents sorted in a descending order. This estimation of the size of the dataset may be used by the sub-task determination module 101 to determine how many tasks the job should be divided into, and may be further used by the sub-task range determination module 102 to assign dataset ranges to each task. If the dataset is particularly small (i.e., small enough that the entire dataset was returned to the initial trawl) then the dataset may be processed in a serial manner as opposed to being passed back to the sub-task determination module 101 for the dataset to be divided into parallel processes.

According to an example, if a 128-bit hash function is used as the checksum, and an initial query to the enterprise search system 110 returns 100 hits with the final hexadecimal checksum being 0x01000000000000000000000000000000 (i.e., the last (alphabetical) checksum for documents sorted in an ascending order), then based on the principal of uniform distribution, the sub-task determination module 101 may determine that there is a high probability that the 100 results represent approximately $1/256^{th}$ (i.e., $1/(16^2)$) of the total number of hits in the dataset. Alternatively, an initial query may return 1000 hits (i.e., based on the configuration of the enterprise search system 110), with the final hexadecimal checksum being 0x10000000000000000000000000000000, whereby the sub-task determination module 101 may determine that there is a high probability that the 1000 results represent approximately $1/16^{th}$ (i.e., $1/(16^1)$) of the total number of hits in the dataset. Based on this information, the sub-task determination module 101 may calculate how many sub-tasks should be used to trawl the data. For example, the sub-task determination module 101 may determine that the 100 results that represent approximately $1/256^{th}$ of the total number of hits in the dataset equate to 25,600 documents (i.e., 100×256). Similarly, the sub-task determination module 101 may determine that the 1000 results that represent approximately $1/16^{th}$ of the total number of hits in the dataset equate to 16,000 documents (i.e., 1000×16). Thus, the total content number representing an approximation of the total dataset may be determined based on the type of checksum function (e.g., 128 bit, 160 bit, etc.), and further based on the final checksum value (e.g., 0x01000000000000000000000000000000) for an initial query response. Based on the estimated number of documents in the dataset (e.g., 25,600 or 16,000 for the foregoing examples), the sub-task determination module 101, may determine, for example, 16 agents are needed to perform 16 sub-tasks (e.g., 1600 documents per agent that performs a sub-task), based on the capacity and/or availability of the agents 109. The sub-task range determination module 102 may further assign each of the sub-tasks different, but generally equal and reasonably sized ranges of the dataset based on the checksum values. Thus, the sub-task range determination module 102 may assign ranges based on a total number of sub-tasks. For example, for 1600 documents per agent, the sub-task range determination module 102 may assign a range of 0x00000000000000000000000000000000 to 0x0FFFFFFFFFFFFFFFFFFFFFFFFFFFFFFF to a first sub-task, a range of 0x10000000000000000000000000000000 to 0x1FFFFFFFFFFFFFFFFFFFFFFFFFFFFFFF to a second sub-task, etc., until a final range of 0xF0000000000000000000000000000000 to 0xFFFFFFFFFFFFFFFFFFFFFFFFFFFFFFFF to the final sub-task for the example of the 100 hits with the final hexadecimal checksum being 0x01000000000000000000000000000000. Note that the first sub-task may be assigned back to the same agent that performed the initial query because it has already queried for and received results for the 0x00000000000000000000000000000000 to 0x01000000000000000000000000000000 range. Similarly, assuming that each sub-task size is configured for 4000 documents (as opposed to 1600 documents), the sub-task range determination module 102 may assign a range of 0x00000000000000000000000000000000 to 0x3FFFFFFFFFFFFFFFFFFFFFFFFFFFFFFF to a first sub-task, a range of 0x40000000000000000000000000000000 to 0x7FFFFFFFFFFFFFFFFFFFFFFFFFFFFFFF to a second sub-task, a range of 0x80000000000000000000000000000000 to 0xBFFFFFFFFFFFFFFFFFFFFFFFFFFFFFFF to a third sub-task, until a final range of 0xC0000000000000000000000000000000 to 0xFFFFFFFFFFFFFFFFFFFFFFFFFFFFFFFF to the final sub-task for the example of the 1000 hits with the final hexadecimal checksum being 0x10000000000000000000000000000000. The ranges for the sub-tasks may correspond to ranges for partial trawls of a dataset as discussed herein.

Figure 3:
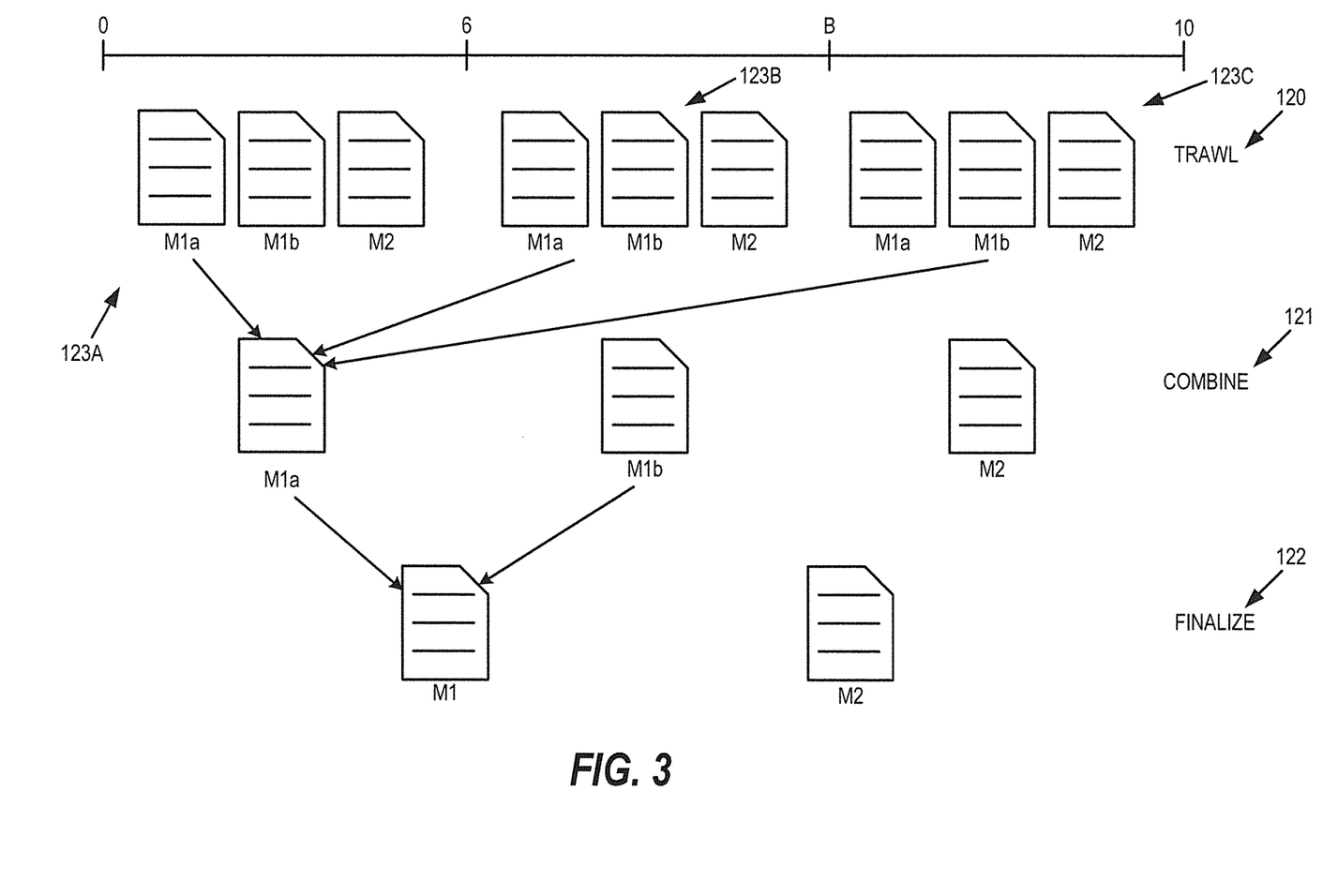
FIG. 3 illustrates trawl, combine, and finalize phases of data analysis for the data analysis control apparatus, according to an example of the present disclosure.

The statistics identification modules (i.e., metric classes) 103 may be used to extend the number and types of statistics being gathered. Different statistics identification modules 103 may be used for statistics, such as, document author, create date, department, etc., or any other user-defined parameter, that may be used for responding to the query 104. For example, when analyzing a dataset, the data analysis control apparatus 100 may proceed through several phases (some of which can partially overlap or occur in parallel). FIG. 3 illustrates trawl, combine, and finalize phases of data analysis for the data analysis control apparatus 100, according to an example of the present disclosure. In the example of FIG. 3, the designations M1*a*, M1*b*, M1, and M2 may represent different files for the different trawl, combine, and finalize phases. For the initial trawl phase 120, the files M1*a*, M1*b*, and M2, may represent files for different statistics identification modules for identification of different statistics such as author, title, duplicates, etc., with respect to the query 104. At the beginning of the initial trawl phase 120, a method may be called on each statistics identification module 103 which returns which fields are needed. The fields needed by each statistics identification module 103 may be queried by the assigned agent (or agents) 109. Each hit may be passed, for example, to a CollateStatistics( ) function in the statistics identification module 103. This implementation may identify hits of interest back to the data analysis control apparatus 100, and/or may write any data of interest to a specified file or series of files. If the marking module 105 has identified hits for marking, these hits may be marked by an assigned agent (or agents) 109 in parallel with the trawl phase 120. When the entire dataset has been trawled, a combine phase 121 may be initiated. If a statistics identification module produced a single file for each partial trawl, then a single combine task may be created for the statistics identification module. If a statistics identification module produced multiple files, then multiple combine tasks may be created. The files produced by each statistics identification module during the trawl phase 120 may be passed back to the statistics identification module during the combine phase 121, and a single output file may be created. A further finalize phase 122 may be used to combine the results of multiple combine tasks into a single file.

Each partial trawl (e.g., the partial trawls 123*a*, 123*b*, 123*c*) may be performed in parallel. Alternatively, the number of partial trawls that are performed in parallel may be based on the number of free agents 109. For the example of FIG. 3, the partial trawl 123*a* may range from hexadecimal 0x00000000000000000000000000000000 to 0x5FFFFFFFFFFFFFFFFFFFFFFFFFFFFFFF (e.g., approximately 0-6 as shown in FIG. 3), the partial trawl 123*b* may range from 0x60000000000000000000000000000000 to 0xAFFFFFFFFFFFFFFFFFFFFFFFFFFFFFFF (e.g., approximately 6-B as shown in FIG. 3), and the partial trawl 123*c* may range from 0xB0000000000000000000000000000000 to 0xFFFFFFFFFFFFFFFFFFFFFFFFFFFFFFFF (e.g., approximately B-10 as shown in FIG. 3). The results of the partial trawls may be built for different subsets of the overall dataset in parallel until all the subsets have been covered. The trawl phase at 120 may be completed when results have been gathered for all of the subsets. At this stage, the combine and finalize phases 121 and 122, respectively, may begin. Moreover, if possible, the combine and finalize phases 121 and 122, respectively, may also be completed in parallel with each other. For example, the finalize phase 122 may start for one of the statistics identification modules 103 before the combine phase 121 is completed for another statistics identification module.

The addition of further statistics identification modules 103 to generate additional statistics may have minimal impact on the length of time that the overall analysis job takes for responding to the query 104. This is because the addition of statistics identification modules 103 may not involve additional queries to the enterprise search system 110. For example, the addition of statistics identification modules 103 may involve the retrieval of additional fields for responding to the query 104.

The marking phase, where the marking module 105 uses an assigned agent (or agents) 109 to tag hits of interest for responding to the query 104, may begin as soon as there are free agents 109 to perform the marking. Thus, the marking phase for the marking module 105 does not need to wait on the trawl phase 120 to completely finish. Further, the marking module 105 may not identify all documents that will need to be marked before using an assigned agent (or agents) 109 to begin the marking of those documents that have been identified. The marking module 105 may also use an assigned agent (or agents) 109 to mark documents as needed upon completion of a partial trawl of a given set of partial trawls, as opposed to after completion of all partial trawls.

Based on the operation of the sub-task determination module 101 and the sub-task range determination module 102, hits (i.e., search results) may be forwarded to the statistics identification modules 103 and/or the marking module 105 in ascending order of the checksum value. This property means that a statistics identification module may readily identify duplicates, as duplicates will be forwarded to the statistics identification module sequentially. Thus, metrics such as the level of duplication may be determined in parallel with other metrics with minimal additional overhead (i.e., no additional queries are needed). Thus, referring to FIG. 3, the partial trawls 123*a*, 123*b*, and 123*c* may be processed independently since any duplicates may be present within a respective partial trawl based on the checksum value. For example, if the partial trawls 123*a*, 123*b*, and 123*c*, respectively result in 10, 20, and 30 duplicates being marked by the marking module 105, the results of the partial trawls may be combined at the combine phase 121 to identify 60 duplicates (i.e., 10+20+30).

The data analysis control apparatus 100 may include asynchronous properties. For example, a user requesting analysis may be provided an analysis job identification (ID). The analysis job identification ID may be used to query results, and/or to check on the progress of an analysis job related to the query 104.

Figure 4:
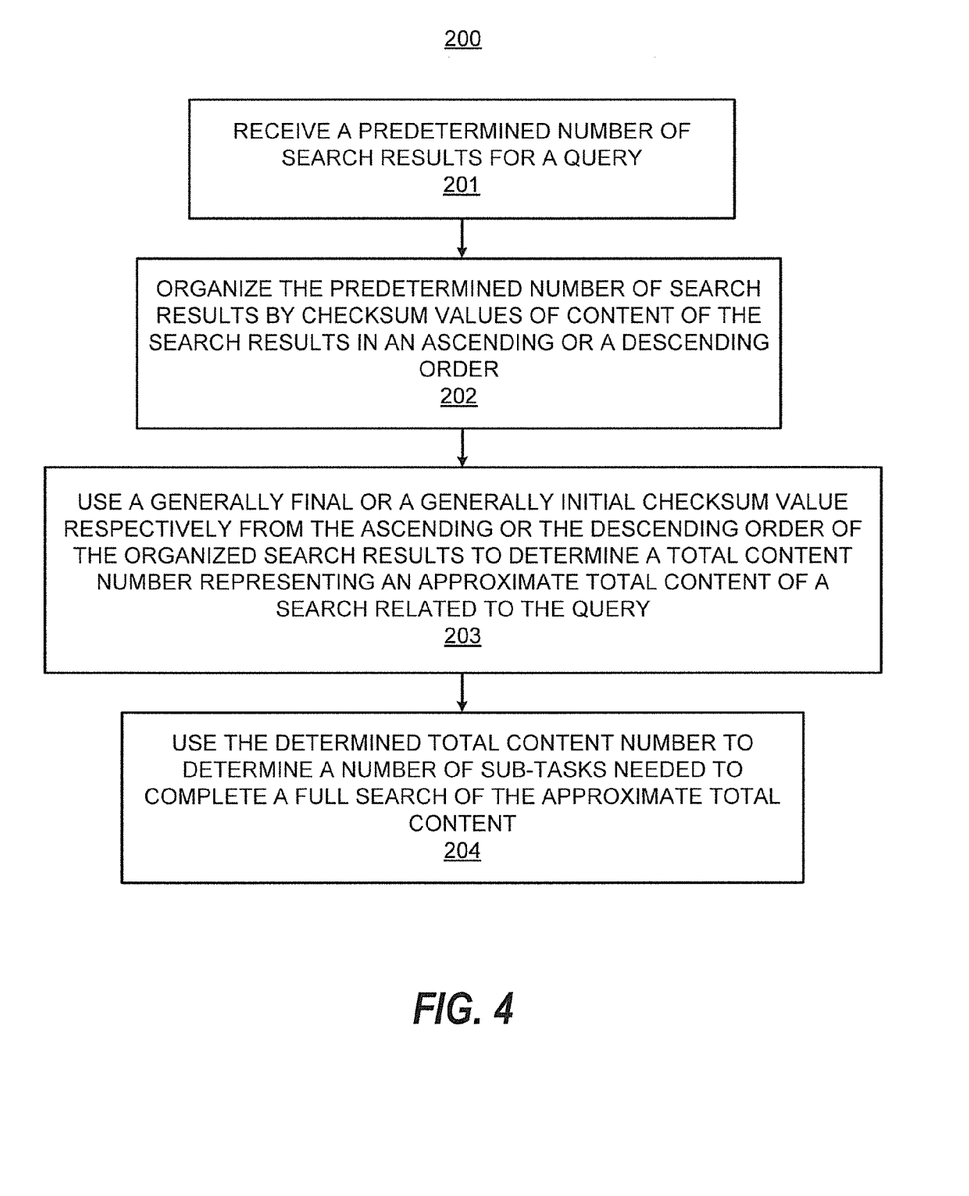
FIG. 4 illustrates a method for data analysis control, according to an example of the present disclosure.

FIG. 4 illustrates a flowchart of a method 200 for data analysis control, corresponding to the data analysis control apparatus 100 whose construction is described in detail above. The method 200 may be implemented on the data analysis control apparatus 100 with reference to FIGS. 1-3 by way of example and not limitation. The method 200 may be practiced in other apparatus.

Referring to FIG. 2, for the method 200, at block 201, the data analysis control may include receiving a predetermined number of search results for a query. For example, referring to FIGS. 1 and 2, the data analysis control apparatus 100 may receive a predetermined number of search results for the query 104 from one of the agents 109.

At block 202, the data analysis control may include organizing the predetermined number of search results by checksum values of content of the search results in an ascending or a descending order. For example, referring to FIGS. 1 and 2, the data analysis control apparatus 100 may organize the predetermined number of search results by checksum values of content of the search results in an ascending or a descending order.

At block 203, the data analysis control may include using a generally final or a generally initial checksum value respectively from the ascending or the descending order of the organized search results to determine a total content number representing an approximate total content of a search related to the query, where the total content number is greater than the predetermined number of search results. For example, referring to FIGS. 1 and 2, the data analysis control apparatus 100 may use a generally final or a generally initial checksum value respectively from the ascending or the descending order of the organized search results to determine a total content number (e.g., 25,600 documents for the foregoing example with the final hexadecimal checksum being 0x10000000000000000000000000000000) representing an approximate total content of a search related to the query 104.

At block 204, the data analysis control may include using the determined total content number to determine a number of sub-tasks needed to complete a full search of the approximate total content. For example, referring to FIGS. 1 and 2, the sub-task determination module 101 may use the determined total content number to determine a number of sub-tasks needed to complete a full search of the approximate total content.

According to a further example, using the determined total content number to determine a number of sub-tasks needed to complete a full search of the approximate total content may further include determining the number of sub-tasks based on a generally equal distribution of search loads to perform the full search. The data analysis control may further include determining a range for each of the sub-tasks based on the determined total content number representing the approximate total content of the search. The data analysis control may further include processing the approximate total content based on the determined range for each of the sub-tasks, where the processing is designated a trawl phase and includes partial trawls that correspond to the determined range for each of the sub-tasks, and marking predetermined statistics for the content during at least one of the partial trawls. The data analysis control may further include combining the marked predetermined statistics in parallel for different partial trawls. The data analysis control may further include processing the approximate total content based on the determined range for each of the sub-tasks, where the processing is designated a trawl phase and includes partial trawls that correspond to the determined range for each of the sub-tasks, combining the partial trawls in a combine phase to generate combined files, and combining the combined files to generate final files representing final search results for the query.

Figure 5:
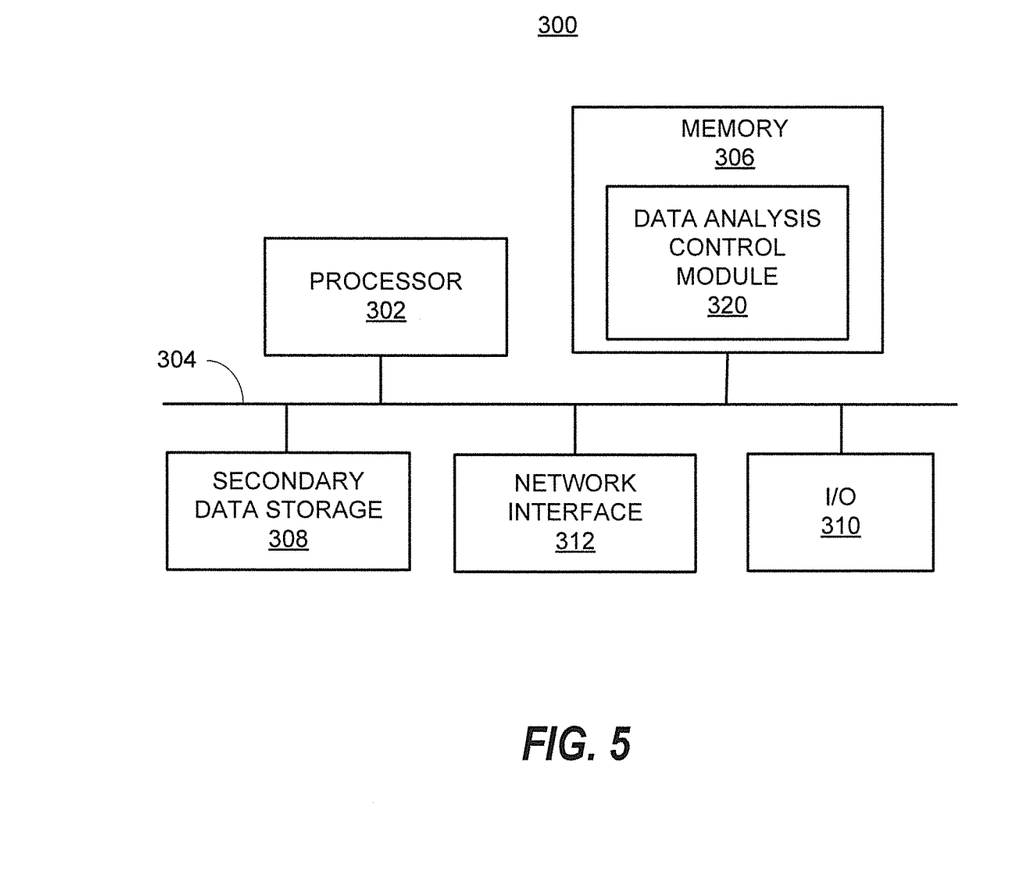
FIG. 5 illustrates a computer system, according to an example of the present disclosure.

FIG. 5 shows a computer system 300 that may be used with the examples described herein. The computer system may represent a generic platform that includes components that may be in a server or another computer system. The computer system 300 may be used as a platform for the apparatus 100. The computer system 300 may execute, by a processor or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 300 may include a processor 302 that may implement or execute machine readable instructions performing some or all of the methods, functions and other processes described herein. Commands and data from the processor 302 are communicated over a communication bus 304. The computer system also includes a main memory 306, such as a random access memory (RAM), where the machine readable instructions and data for the processor 302 may reside during runtime, and a secondary data storage 308, which may be non-volatile and stores machine readable instructions and data. The memory and data storage are examples of computer readable mediums. The memory 306 may include a data analysis control module 320 including machine readable instructions residing in the memory 306 during runtime and executed by the processor 302. The data analysis control module 320 may include the modules of the apparatus shown in FIG. 1.

The computer system 300 may include an I/O device 310, such as a keyboard, a mouse, a display, etc. The computer system may include a network interface 312 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A method for data analysis control, the method comprising:
  receiving a predetermined number of search results for a query;
  organizing the predetermined number of search results by checksum values of content of the search results in an ascending or a descending order;
  using one of a generally final and a generally initial checksum value from the ascending or the descending order of the organized search results to determine a total content number representing an approximate total content of a search related to the query, wherein the total content number is greater than the predetermined number of search results;
  using the determined total content number to determine, by a processor, a number of sub-tasks needed to complete a full search of the approximate total content; and
  determining a range for each of the sub-tasks and allocating each range to one of a plurality of agents to execute the full search.

2. The method of claim 1, wherein using one of a generally final and a generally initial checksum value from the ascending or the descending order of the organized search results to determine a total content number representing an approximate total content of a search related to the query further comprises:
  using one of a final and an initial checksum value from the ascending or the descending order of the organized search results to determine the total content number representing the approximate total content of the search related to the query.

3. The method of claim 1, wherein the content of the search includes documents.

4. The method of claim 1, wherein using the determined total content number to determine a number of sub-tasks needed to complete a full search of the approximate total content further comprises:

determining the number of sub-tasks based on a generally equal distribution of search loads to perform the full search.

5. The method of claim 1, wherein the determining the range for each of the sub-tasks is based on the determined total content number representing the approximate total content of the search.

6. The method of claim 5, further comprising:
processing the approximate total content based on the determined range for each of the sub-tasks, wherein the processing is designated a trawl phase and includes partial trawls that correspond to the determined range for each of the sub-tasks; and
marking predetermined statistics for the content during at least one of the partial trawls.

7. The method of claim 6, wherein the predetermined statistics include duplicate documents in the content.

8. The method of claim 5, further comprising:
processing the approximate total content based on the determined range for each of the sub-tasks, wherein the processing is designated a trawl phase and includes partial trawls that correspond to the determined range for each of the sub-tasks; and
marking predetermined statistics for the content during a plurality of the partial trawls.

9. The method of claim 8, further comprising:
combining the marked predetermined statistics in parallel for different partial trawls.

10. The method of claim 5, further comprising:
processing the approximate total content based on the determined range for each of the sub-tasks, wherein the processing is designated a trawl phase and includes partial trawls that correspond to the determined range for each of the sub-tasks;
combining the partial trawls in a combine phase to generate combined files; and
combining the combined files to generate final files representing final search results for the query.

11. The method of claim 1, wherein the checksum values are based on a checksum function that provides a generally uniform distribution of the checksum values.

12. A data analysis control apparatus comprising:
a memory storing machine readable instructions to:
receive a predetermined number of search results for a query;
organize the predetermined number of search results by checksum values of content of the search results in an ascending or a descending order;
use one of a generally final and a generally initial checksum value from the ascending or the descending order of the organized search results to determine a total content number representing an approximate total content of a search related to the query, wherein the total content number is greater than the predetermined number of search results;
use the determined total content number to determine a number of sub-tasks needed to complete a full search of the approximate total content by determining the number of sub-tasks based on a generally equal distribution of search loads to perform the full search; and
determine a range for each of the sub-tasks and allocate each of the ranges to one of a plurality of agents to execute the full search; and
a processor to implement the machine readable instructions.

13. The data analysis control apparatus according to claim 12, wherein the determining the range for each of the sub-tasks is based on the determined total content number representing the approximate total content of the search.

14. The data analysis control apparatus according to claim 12, wherein the checksum values are based on a checksum function that provides a generally uniform distribution of the checksum values.

15. A non-transitory computer readable medium having stored thereon machine readable instructions to provide data analysis control, the machine readable instructions, when executed, cause a computer system to:
receive a predetermined number of search results for a query;
organize the predetermined number of search results by checksum values of content of the search results in an ascending or a descending order;
use one of a generally final and a generally initial checksum value from the ascending or the descending order of the organized search results to determine a total content number representing an approximate total content of a search related to the query, wherein the total content number is greater than the predetermined number of search results;
use the determined total content number to determine, by a processor, a number of sub-tasks needed to complete a full search of the approximate total content; and
determine a range for each of the sub-tasks based on the determined total content number representing the approximate total content of the search and allocate each range to one of a plurality of agents to execute the full search.

* * * * *